United States Patent

[11] 3,589,418

| [72] | Inventor | Arthur E. Clark |
| | | 745 La Prairie, Ferndale, Mich. 48220 |
| [21] | Appl. No. | 824,766 |
| [22] | Filed | May 15, 1969 |
| [45] | Patented | June 29, 1971 |

[54] HANDSAW WITH BLADE TENSION SETTER AND ABSORBER
10 Claims, 6 Drawing Figs.

| [52] | U.S. Cl. | 145/33 |
| [51] | Int. Cl. | B27b 21/02 |
| [50] | Field of Search | 145/33, 34 |

[56] References Cited
UNITED STATES PATENTS
| 1,395,511 | 11/1921 | Morgan | 145/34 |
| 2,519,904 | 8/1950 | Hendricksen et al. | 145/33 |

*Primary Examiner*—Travis S. McGehee
*Attorney*—Hauke, Gifford & Patalidis

ABSTRACT: A handsaw having an adjustable handle and rigid frame for supporting a commercially available saw blade having a mounting hole in each end. A screw passing through one hole threads to a forward leg portion of the frame and supports the blade longitudinally. A bifurcated rearward leg portion of the frame has transversely aligned, elongated apertures extending therethrough and embraces the other end of the blade. An apertured clevislike member embraces the rearward leg portion and a pin through the apertures totally supports the clevislike member on the rearward leg portion and extends through the hole in the other end of the blade. A spring biased plunger radially disposed from the pivot pin is carried by the clevislike member and engages a notch in the rearward leg portion of the frame to substantially axially align with the saw blade, to thereby lock and resiliently set the tension of the saw blade.

PATENTED JUN29 1971 3,589,418
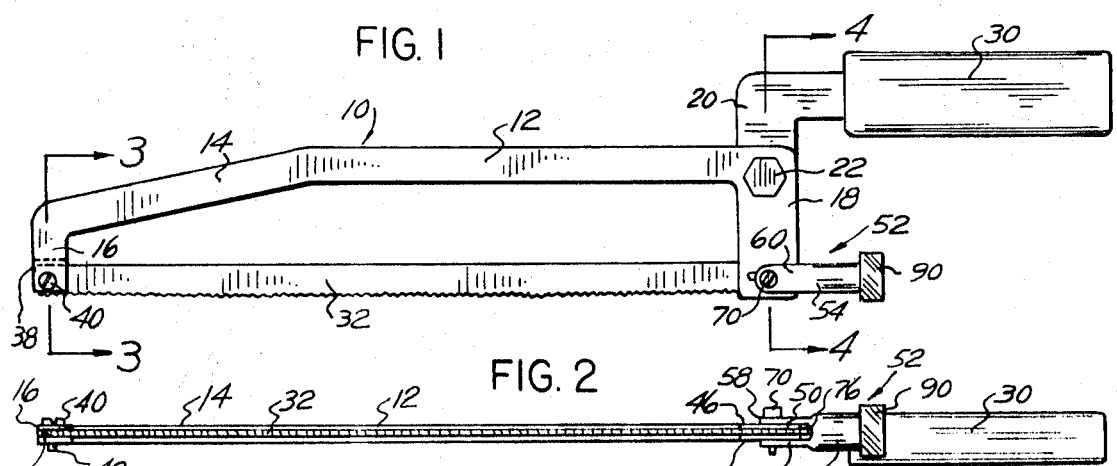
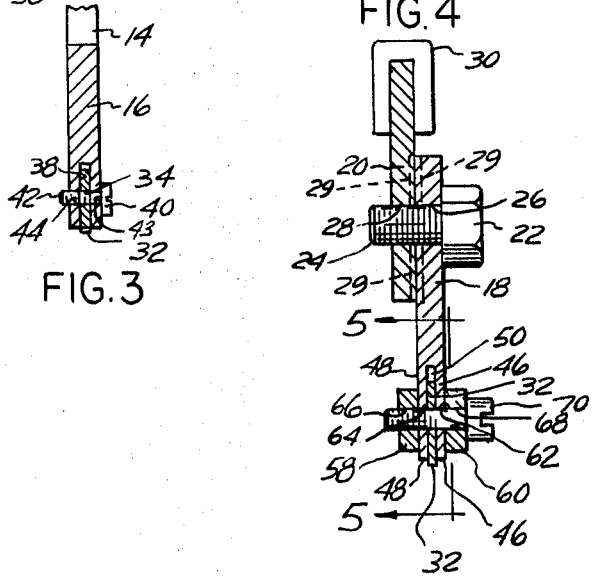
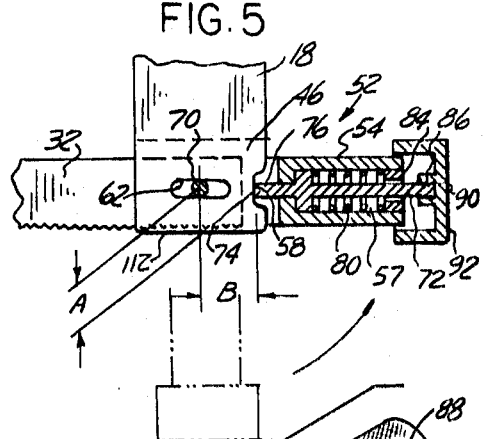
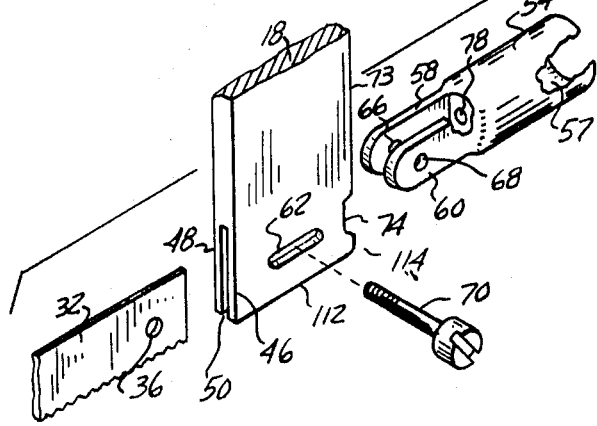
INVENTOR
ARTHUR E. CLARK
BY Hauke, Krass, Gifford, & Patalidis
ATTORNEYS

HANDSAW WITH BLADE TENSION SETTER AND ABSORBER

BACKGROUND OF THE INVENTION

1. Field of the Invention

The present invention relates to hand saws and in particular to a hacksaw having a means for locking and tensioning the blade.

2. Description of the Prior Art

A substantially rigid frame, adapted to support and tension a handsaw blade with a slotted or notched drawbolt journaled through an eye in the frame having a thumb nut for tightening and placing the blade under tension, is conventional.

A common disadvantage of such handsaws is that a manual adjustment is required in order to tension the blade and it may work loose. Also, it is well known that a saw blade lasts longer when operated at a selected, predetermined tension, but thumb nuts do not gauge tension, so during operation, the blade is not readily set at the proper tension. When a blade is subjected to excess tension it has a tendency to wear rapidly and unevenly and to break more easily.

SUMMARY OF THE INVENTION

Accordingly, there is need for a handsaw having means for uniformly setting the tension of a commercially available blade and for relieving blade tension when obstacles are encountered during use. The present invention provides such a handsaw comprising a frame having a forward end secured to one end of a commercially available blade, and a bifurcated rearward end portion embracing the other end of the blade. Both the blade and the bifurcated sections are embraced by the legs of a yoke adapted to pivot about a removable pin extending through the legs of the bifurcated section and the blade. A spring-biased plunger carried by the yoke engages a notch in the rearward end portion when the yoke is substantially longitudinally aligned with the blade to thereby consistently position the blade in a locked operating position under a predetermined operating tension. The yoke may move slightly forward under spring tension when the blade meets undue resistance when cutting and thereby acts to relieve blade tension when necessary.

DESCRIPTION OF THE DRAWINGS

The description refers to the accompanying drawing in which like reference characters refer to like parts throughout the several views, and in which:

FIG. 1 is a side elevational view of a preferred handsaw embodying the present invention;

FIG. 2 is a bottom view of the handsaw of FIG. 1;

FIG. 3 is a cross-sectional view taken substantially on the line 3-3 of FIG. 1;

FIG. 4 is a cross-sectional view taken substantially on the line 4-4 of FIG. 1;

FIG. 5 is a fragmentary side elevational and partially cross-sectioned view taken substantially on the line 5-5 of FIG. 4;

FIG. 6 is an exploded perspective view, partially broken away, of the portion of the handsaw shown in FIG. 5.

DESCRIPTION OF THE EXAMPLE EMBODIMENTS

Referring to the drawings, and in particular to FIGS. 1 and 2, a handsaw embodying the present invention comprises a frame 10 preferably made of flat and substantially heavy gauge sheet steel material or the like, including a substantially main straight body portion 12, having a sloped integral forward end portion 14. A forward arm 16 extends from the portion 14 and an integral rearward arm 18 extends from the opposite end of the main body portion 12, preferably as shown.

A handle frame 20 having a handle grip 30 is preferably adjustably secured to the rearward portion of the frame 10 by means of a bolt 22 having a threaded shank 24 passing through an aperture 26 in the main body portion 12 and threading into a complementary threaded aperture 28 in the handle frame 20. It will be appreciated that the handle frame 20 may be oriented in any angular position and may be selectively positioned simply by loosening the bolt 22, rotating the handle 30 to the selected position and then tightening the bolt 22. An optional construction of the engagement surfaces of the body portion 12 and the handle frame 20 includes serrations 29 radially radiating from the mounting apertures 26 and 28, respectively, to thereby provide an interlock between the engagement surfaces when the bolt 22 is tightened. To accomplish work in a closely confined area, the user can optionally remove the handle frame 20 entirely, simply by loosening the bolt 22 and completely withdrawing it.

Attached to the forward and rearward arms 16 and 18 is a commercially available saw blade 32 having standard punched apertures 34 and 36, respectively, at each end of the blade 32. As illustrated in FIGS. 2 and 3, the arm 16 has a slot 38 in which the blade 32 is mounted. The blade aperture 34 registers with apertures 43 and 44 of the arm 16 for receiving therethrough a screw 40 having a threaded body 42 for threading within the aperture 44.

The rearward arm 18 is preferably bifurcated, thereby comprising legs 46 and 48 with a slot 50 therebetween. A tension setting and absorbing device generally illustrated at 52 embraces the bifurcated end portion including the legs 46 and 48 and securely locks the blade 32 in an operating position to retain the blade 32 at a predetermined tension. The device 52 comprises a cylindrical body portion 54 having an open-ended inner chamber 57. Extending longitudinally from the body portion 54 are coextensive clevis-type arms 58 and 60 adapted to embrace the frame legs 46 and 48 and the blade 32. The legs 46 and 48 have transversely aligned elongated slots 62 and 64, respectively, and the arms 58 and 60 have transversely aligned holes 66 and 68, respectively, for receiving a threaded pin 70 therethrough and through the aperture 36 of the blade 32 for threading within the hole 66, as seen in FIG. 4.

FIGS. 1, 2 and 5 illustrate the clevislike tension device 52 in its locked operational position. A spring biased plunger 72 is carried in the cylindrical body portion 54 and extends through a hole 78 to engage detents 74 disposed on an outer edge 73 of the legs 46 and 48. The plunger 72 is biased against the detents 74 by a coil spring 80 compressed within the chamber 57 between an abutment 82 integral with the plunger 72 and an annular plug 84 secured in the open end of the chamber 57 by any means such as swaging or the like. The annular plug 84 has a bore 85 through which extends the rear end of the plunger 72.

The rear end of the plunger 72 has threads 86 which engage complementary threads 88 included in a preferably hollow knurled pull knob 90 as shown, which when pulled, releases the forward end of the plunger 72 from the detents 74.

Before mounting the blade 32 to the handsaw, the tension device 52 including the pin 70 is completely detached and separated from the arm 18. The forward end of the blade 32 is first attached to the forward arm 16 by securing the screw 40 thereto. The other end of the blade 32 is then positioned within the slot 50 between the legs 46 and 48 of the frame arm 18 and the blade aperture 36 is registered with the transversely aligned slots 62 and 64. Holding the member 52 in a downwardly extending position, the arms 58 and 60 are positioned to embrace the frame legs 46 and 48, aligning the holes 66 and 68 with the slots 62 and 64 and the aperture 36 of the blade 32, after which the pin 70 is inserted therethrough and threaded into the hole 66. With the clevislike member 52 extending downwardly as shown by broken lines in FIG. 5, the spring 80 therein will not be compressed because the vertical distance A from the slots 60 and 62 to the lower ends of the respective legs 46 and 48 is less than the mean horizontal distance B from the slot 62 to the detent 74, so the end of the plunger 76 will not abut the legs 46 and 48.

To lock the clevislike member 52 it is pivoted upwardly about the pin 70 toward the handle 30, while the knob 90 is pulled to retract the plunger 76 so that its end will clear the corners of the legs 46 and 48 and can be seated in the detents 74. The corners of the legs 46 and 48 are rounded as shown to assist in camming the end of the plunger toward the spring compressed position as the tension device 52 is pivoted toward the full line location until such time as the end of the plunger 76 is aligned with and lockingly engages the detents 74.

Thus the blade 32 will be locked and tensioned at a selected level depending on the compression of the spring 80 to effect maximum operating performance. To release or replace the blade 32, the pull knob 90 is pulled to disengage the plunger 76 from the detent 74 and the tension device 52 is then pivoted downwardly to the broken line position of FIG. 5, after which the threaded pin 70 and the screw 40 can be removed to thereby separate the blade 32 from the handsaw frame. Accordingly, a handsaw has been disclosed which makes the attachment and removal of its sawblade a relatively simple operation. In addition, when attached the saw blade is automatically tensioned to a predetermined degree providing optimum performance. As will be appreciated, the disclosed handsaw is of durable construction, convenient to use and economical to manufacture.

Although I have disclosed only one preferred embodiment of my invention, it will be apparent to one skilled in the art to which the invention pertains that various changes and modifications may be made therein without departing from the spirit of the invention within the scope of the appended claims.

I claim:

1. A handsaw structure for supporting a commercial blade having an aperture proximate each end, comprising:
   a curved frame having first and second end portions;
   a handle disposed proximate said first end portion;
   means engaging said second end portion and the blade at one aperture to thereby longitudinally dispose the blade;
   means engaging said first end portion and the blade at the other aperture to thereby support the other end of the blade, comprising:
      at least one longitudinally elongated aperture in said first end portion;
      a detent disposed in said first end portion on the frame edge;
      a pivotal clevislike member having transversely aligned apertures in each leg of a bifurcated end which embraces the blade and said first end portion;
      a pin traversing the respective apertures of said legs, the blade, and said first end portion; and
      a rod supported by said clevislike member resiliently biased to engage the detent when pivotally aligned by said member.

2. A handsaw structure for supporting a commercial saw blade having apertures proximate each end, comprising:
   a frame having a longitudinally extending center portion and first and second integral arms, one each extending substantially transversely from each end of said center portion;
   a handle disposed proximate said first arm;
   means normally engaging said second arm and the blade at one aperture to thereby support the blade in a longitudinal plane;
   means normally engaging said first arm and the blade at the other aperture to thereby support the other end of the blade in the longitudinal plane comprising:
      a longitudinally elongated aperture in said first arm;
      a notch disposed in said first arm substantially aligned with the longitudinal axis of the elongated aperture;
      a pivotal clevislike member having transversely aligned apertures in each portion of a bifurcated end which embraces the blade and said first arm at their respective apertures, and a bore in said clevislike member extending transversely to the aligned apertures;
      a pivot pin passing through the transversely aligned apertures and the respective apertures of the blade and said first arm to thereby pivotally support said clevislike member; and
      a rod extending through said bore resiliently biased to engage the notch when pivotally aligned therewith by said clevisilke member.

3. The handsaw structure as defined in claim 1, wherein said first end portion is bifurcated and encompasses the blade, each side of said bifurcated end having transversely aligned longitudinally elongated apertures.

4. The handsaw structure as defined in claim 1, wherein said first-mentioned means comprises a setback flat plane in the second end portion having a threaded aperture for engaging a side of the blade and a threaded screw traversing the blade and plane apertures.

5. The handsaw structure as defined in claim 1, wherein said handle is integral with said frame.

6. The handsaw structure as defined in claim 1, wherein said handle is pivotally engaged with said frame to thereby be variably angularly oriented.

7. The handsaw structure as defined in claim 1, wherein said detent is disposed at the frame edge away from said second end portion and proximate the end of said first end portion.

8. The handsaw structure as defined in claim 1, wherein a saw blade is disposed between said second end portion supported thereat by said first-mentioned means and said first end portion supported and tensioned thereat by said second-mentioned means.

9. The handsaw structure as defined in claim 1, wherein said rod is resiliently biased by a spring carried by said pivotal clevislike member.

10. The handsaw structure as defined in claim 9, further including a knob affixed to the rod to thereby provide a gripping surface to exert a pull force upon said rod to release it from said detent.